United States Patent [19]
Panyard

[11] Patent Number: 5,692,790
[45] Date of Patent: Dec. 2, 1997

[54] SYSTEM FOR LOCATING AN END EFFECTOR OF A ROBOT RELATIVE TO A PART

[75] Inventor: James Robert Panyard, Westland, Mich.

[73] Assignees: Ford Motor Company; Ford Global Technologies, Inc., both of Dearborn, Mich.

[21] Appl. No.: 627,840

[22] Filed: Apr. 3, 1996

Related U.S. Application Data

[63] Continuation of Ser. No. 276,575, Jul. 18, 1994, abandoned.

[51] Int. Cl.⁶ .................................................. B25J 15/00
[52] U.S. Cl. ........................... 294/86.4; 414/729; 901/45
[58] Field of Search .................... 414/729; 294/86.4, 294/97; 901/39, 37, 45

[56] References Cited

U.S. PATENT DOCUMENTS

| | | | |
|---|---|---|---|
| 2,713,419 | 7/1955 | Hayes | 294/115 X |
| 4,242,778 | 1/1981 | Kay | 24/230 R |
| 4,611,843 | 9/1986 | Burger et al. | 294/86.4 |
| 4,697,741 | 10/1987 | Dengler et al. | 239/391 |
| 4,738,108 | 4/1988 | Fukuyama et al. | 294/98.1 |
| 4,867,595 | 9/1989 | Hoffman | 294/86.4 X |
| 4,892,457 | 1/1990 | Bartlett et al. | 414/735 |
| 4,919,586 | 4/1990 | Derby | 414/735 |
| 4,936,732 | 6/1990 | Naab et al. | 414/408 |
| 5,131,706 | 7/1992 | Appleberry | 294/86.4 X |

*Primary Examiner*—Donald W. Underwood
*Attorney, Agent, or Firm*—Joseph W. Malleck; Roger L. May

[57] ABSTRACT

A system including a specifically-shaped probe and a complementarily-shaped hole formed in a surface of a part to be picked up ensures proper alignment between an end effector which picks up the part and the part itself. The probe includes first, second, third and fourth mutually converging locating surfaces terminating at a rounded tip at a free end of the probe. The probe is preferably diamond-shaped in cross-section along its entire length and the hole, consequently, is also diamond-shaped. The hole is defined by an inner peripheral diamond-shaped surface configured to be immediately adjacent and substantially parallel to each of the locating surfaces only when the end effector is in a proper pick up position and orientation with respect to the part. Preferably, the end effector is a gripper wherein the probe is adapted to be secured between gripping jaws of the gripper. In the preferred embodiment, the part comprises dunnage.

5 Claims, 3 Drawing Sheets

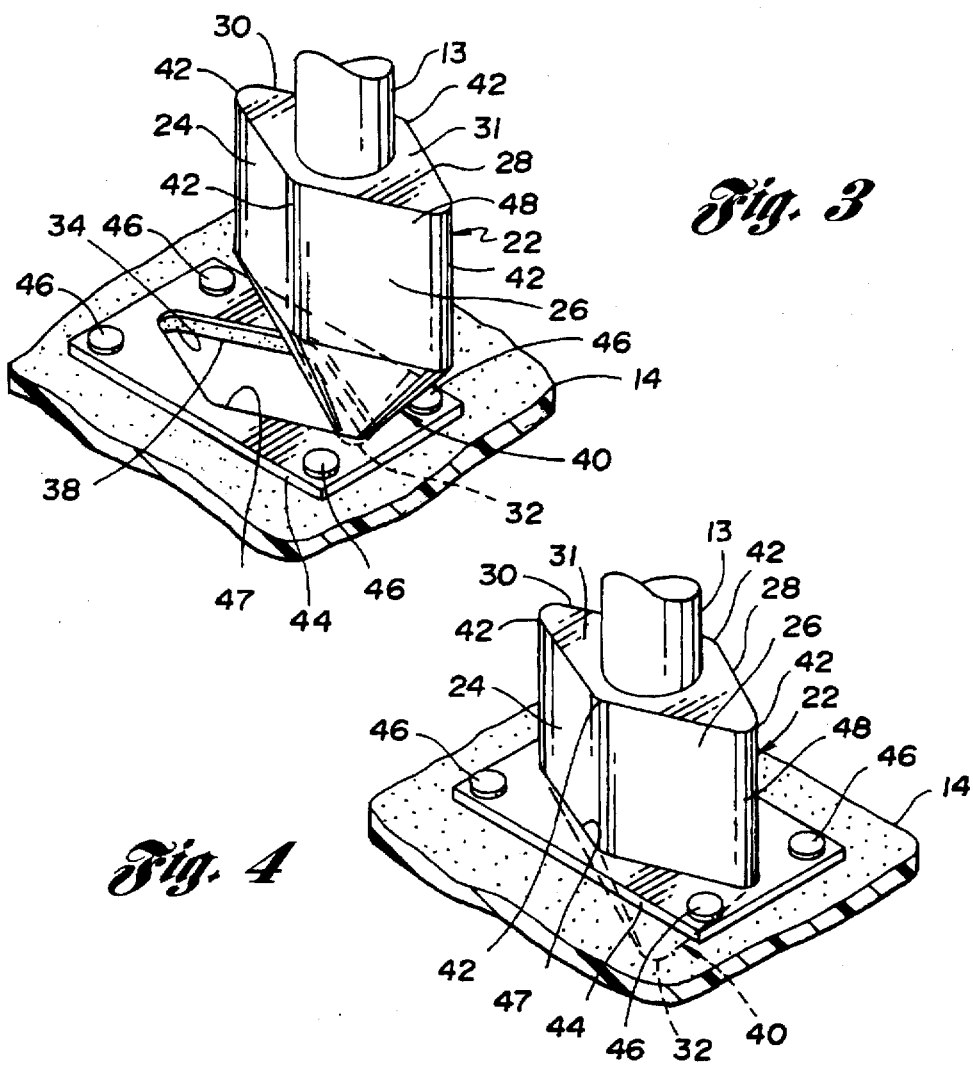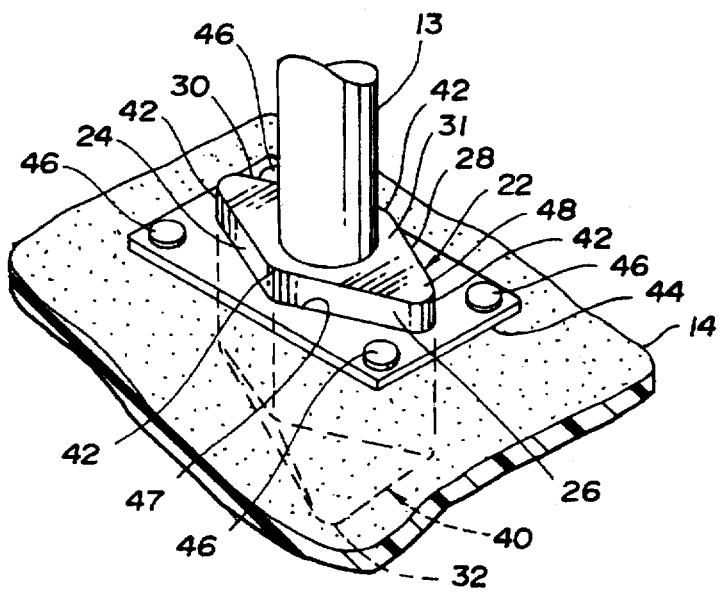

SYSTEM FOR LOCATING AN END EFFECTOR OF A ROBOT RELATIVE TO A PART

CROSS-REFERENCE TO RELATED APPLICATION

This is a continuation of application(s) Ser. No. 08/276,575, filed on Jul. 18, 1994 and now abandoned.

This application is related to U.S. patent application Ser. No. 274,574, filed on the same day as this application, entitled "Robotic Gripper", which is assigned to the assignee of the present application and which is incorporated in its entirety by reference hereby.

TECHNICAL FIELD

The present invention relates to a system for locating an end effector of a robot relative to a part and, in particular, to a system for locating an end effector of a robot relative to a part so that the robot can pick up the part.

BACKGROUND ART

In order to properly pick up a part such as a piece of dunnage by means of a robot, an end effector of the robot must be properly positioned and aligned with respect to the part. In other words, the end effector must be in a proper pick up position and orientation with respect to the part.

Current technology uses locating methodology which is typically unique to each individual application and when the part comprises a piece of dunnage, the locating methodology may require the use of wipers outside of dunnage limits. Most pin locators require two such pins to maintain angular integrity. However, both methods are more complex than a single locating detail to maintain part location integrity.

The U.S. Pat. No. to Naab et al, 4,936,732, discloses the use of a triangular gripping and carrying plate positioned at the end of a gripper arm for the purpose of aligning the arm with respect to a collection bin.

The U.S. Pat. Nos. to Kay, 4,242,778, Burger et al, 4,611,843, Dengler et al, 4,697,741, Fukuyama et al, 4,783,108, and Derby, 4,919,586, all disclose various conical configurations designed to assist in the alignment of robotic-type grippers with respect to the article that is to be gripped.

However, one problem with the above-noted prior art methods and systems is that they fail to provide a generic solution to the problem of positioning a robotic end effector with respect to the part it is to pick up.

SUMMARY OF THE INVENTION

An object of the present invention is to provide a system for locating an end effector of a robot relative to a part so that the robot can pick up the part wherein the system provides a generic solution of properly positioning the end effector to the proper pick up position and orientation with respect to the part.

Another object of the present invention is to provide a system for locating an end effector of a robot relative to a part so that the robot can pick up the part wherein the system enables the end effector to be designed with a minimum amount of complexity and a minimum amount of weight.

In carrying out the above objects and other objects of the present invention, a system is provided for locating an end effector of a robot relative to a part so that the robot can pick up the part. The robot includes a base, an arm assembly supported for movement on the base, and a compliance device for mounting the end effector on a free end of the arm assembly so that the end effector can adapt to misalignments between the end effector and the part. The end effector is movable to occupy the proper pick up position and orientation with respect to the part. The system includes a probe adapted to be mounted for movement with the end effector and including first, second, third and fourth mutually converging locating surfaces terminating at a round tip at a free end of the probe. The system also includes a diamond-shaped hole formed in a surface of the part. The diamond-shaped hole is defined by an inner peripheral surface configured to be immediately adjacent and substantially parallel to each of the locating surfaces only when the end effector is in the proper pick up position and orientation.

Preferably, the first, second, third and fourth surfaces define a pyramid having corners which are blended into radii to form the outer surface of the tip at the free end of the probe.

Also, preferably, the diamond-shaped hole has a major length and a minor length approximately one-half the length of the major length.

Still preferably, the system further includes a plate adapted to be fixedly secured to the part about the hole and having an aperture formed completely therethrough. The aperture is substantially identical in size and shape to the hole for reinforcing the part above the hole.

The advantages accruing to the invention are numerous. For example, the system takes into account lateral, transverse and angular skews. The system also enables the end effector to be designed with a minimum amount of complexity and weight.

Also, the ability of the system to move the end effector so that it occupies a proper pick up position and orientation relative to the part makes the design of such robotic end effectors much simpler and allows for the construction of generic end effectors for picking up parts.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a view, partially broken away and in cross-section, of the probe of FIGS. 1 and 2 in a first position relative to a locating plate and hole;

FIG. 4 is a view, partially broken away and in cross-section, of the probe of FIGS. 1 and 2 in a second position relative to the locating plate; and FIG. 5 is a view, partially broken away and in cross-section, of the probe of FIGS. 1 and 2 in a proper pick up position and orientation relative to the locating plate.

BEST MODE FOR CARRYING OUT THE INVENTION

Figure 1:
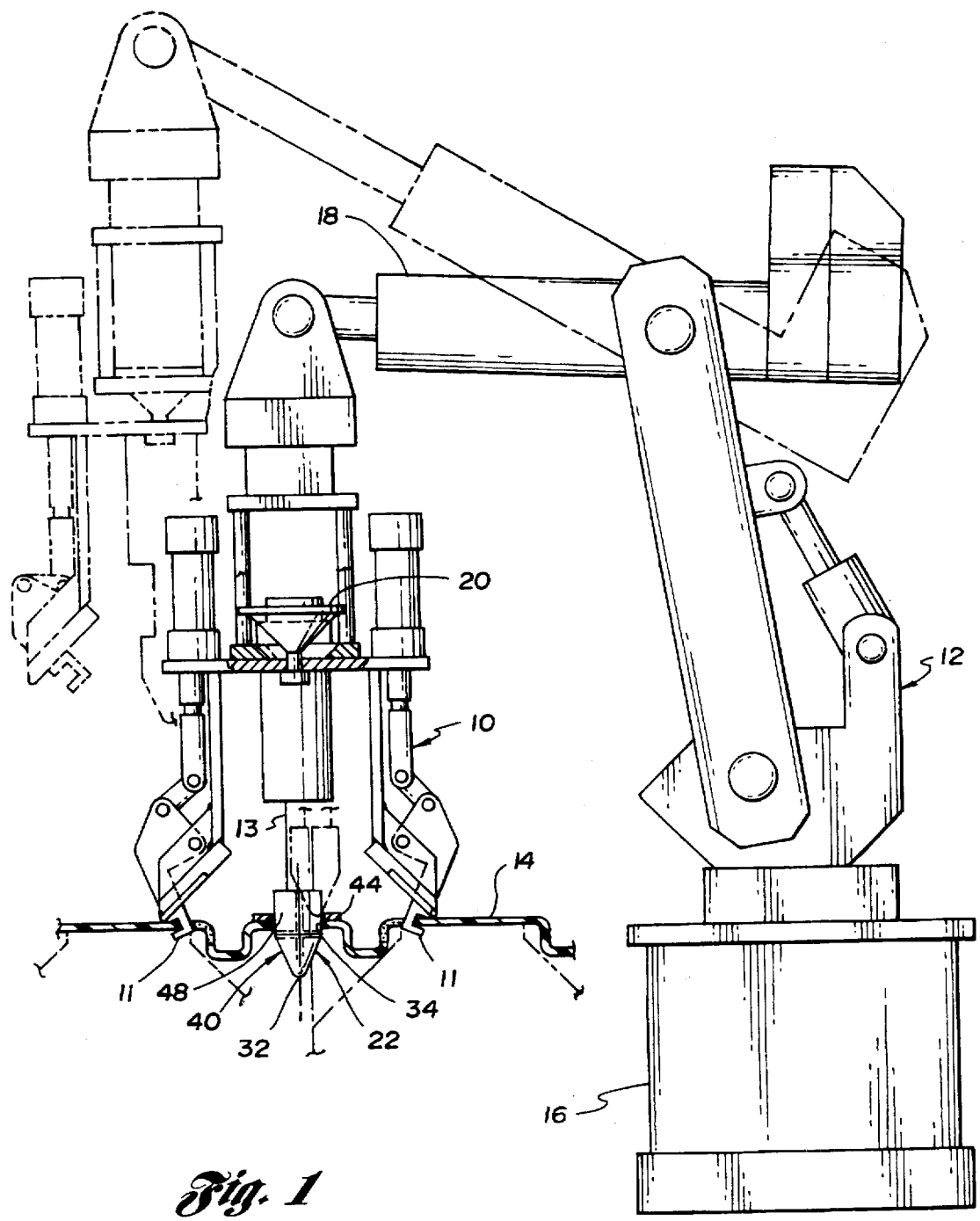
FIG. 1 is a side elevational perspective view, partially broken away and in cross-section, illustrating a system of the invention in an operating environment.
Figure 2:
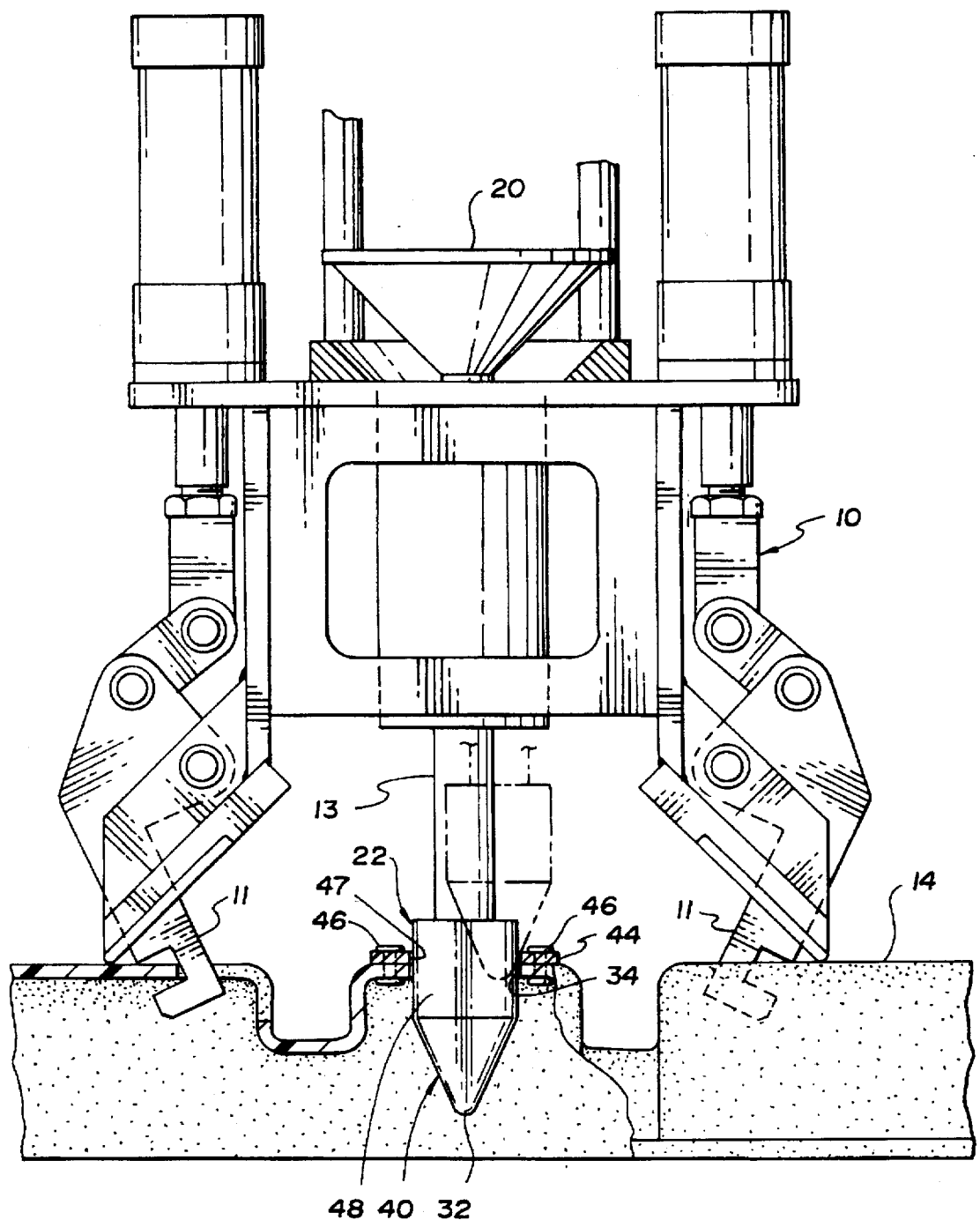
FIG. 2 is an enlarged view, partially broken away and in cross-section, of the system of FIG. 1 including a probe constructed in accordance with the present invention with one of its positions illustrated in phantom.

Referring now to the drawing figures, there is illustrated in FIGS. 1 and 2, a system for locating an end effector in the form of a gripper, generally indicated at 10, of a robot, generally indicated at 12, relative to a part such as a piece of dunnage 14. The robot 12 includes a base 16 and an arm assembly 18 supported for movement on the base 16. A compliance device 20 mounts the gripper 10 on a free end of the arm assembly 18 so that the gripper 10 can adapt to misalignments between the gripper 10 and the dunnage 14. By adapting to such misalignments, the robot 12 can pick up the part 14.

The robot 12, including the arm assembly 18, is capable of moving the gripper 10 to occupy a proper pick up position and orientation with respect to the part 14, as illustrated in FIGS. 1 and 2.

The system of the present invention includes a probe, generally indicated at 22, which is adapted to be mounted on a shaft 13 for movement with the gripper 10 approximately mid-way between its pair of spaced gripping jaws 11. Obviously, the probe 22 can be located at other locations on the gripper 10 depending on the particular application. A detailed description of the gripper 10 can be found in the above-noted application.

The probe 22, as illustrated in FIGS. 3, 4 and 5, includes first, second, third and fourth mutually converging locating surfaces 24, 26, 28 and 30, respectively. The surfaces 24, 26, 28 and 30 begin at a top surface 31 of the probe 22 and terminate at a rounded tip 32 as a free end of the probe 22.

The system also includes a diamond-shaped hole 34 formed in a surface 36 of the part 14, as best shown in FIG. 3. The diamond-shaped hole 34 is defined by an inner peripheral surface 38 which is configured to simultaneously contact each of the locating surfaces 24, 26, 28 and 30 only when the gripper 10 is in a proper pick up position and orientation with respect to the dunnage 14, as shown in FIGS. 1, 2 and 5.

As illustrated in the drawing figures, the first, second, third and fourth surfaces 24, 26, 28 and 30, respectively, define an inverted pyramid, generally indicated at 40, having corners 42 between adjacent surfaces of the surfaces 24, 26, 28 and 30. Each of the corners 42 is blended into a radius wherein the radii form the outer surface of the tip 32 at the free end of the probe 22.

Preferably, the diamond-shaped hole 34 has a major length and a minor length which is approximately one-half the length of the major length as illustrated in FIGS. 3, 4 and 5.

Also, preferably, the system includes a plate 44 which is adapted to be fixedly secured to the dunnage 14 about the hole 34 by fasteners 46. The plate 44 has an aperture 47 which extends completely therethrough the plate 44. The aperture 47 is substantially identical in size and shape to the hole 34 for reinforcing the surface 36 of the dunnage 14 about the hole 34. The plate 44 is primarily provided to reinforce the dunnage 14 if the dunnage 14 is reused and if the dunnage 14 is made of materials that are not conducive to long-term handling.

The probe 22 preferably is diamond-shaped in cross-section. The size of a shaft portion 48 of the probe 22 is substantially the same size as the shape of the diamond-shaped hole 34 in the dunnage 14 with the addition of small clearance to allow the probe 22 to pass through the hole 34 until the first, second, third and fourth surfaces 24, 26, 28 and 30, respectively, are immediately adjacent and substantially parallel to the inner peripheral surface 38 which defines the diamond-shaped hole 34.

As is readily understood by one of ordinary skill in the art, as the probe 22 moves into engagement with the dunnage 14, the tip 32 of the probe 22 must be in the vicinity of the diamond-shaped hole 34 in the dunnage 14, as illustrated in FIG. 3. That is, if the locus points were projected out from the edges of the diamond-shaped hole 34 in the dunnage 14, and the point or tip 32 of the probe 22 must be within this locus. As the probe 22 crosses the plane of the dunnage 14, any misalignment will be directed into alignment as the sides of the pyramid 40 contact the edges of the diamond-shaped hole 34 in the dunnage 14, as illustrated in FIG. 4. Consequently, the alignment is achieved in an X direction, a Y direction, and/or angular skew, as illustrated in FIG. 5.

While the best mode for carrying out the invention has been described in detail, those familiar with the art to which this invention relates will recognize various alternative designs and embodiments for practicing the invention as defined by the following claims.

I claim:

1. A system for locating an end effector of a robot relative to a part so that the end effector can adapt to misalignments between the end effector and the part, the end effector being movable laterally, transversely and angularly to occupy a proper pick up position and orientation with respect to the part so that the end effector can pick up the part, the system comprising:

an end effector;

a single probe adapted to be mounted for movement with the end effector and including first, second, third, and fourth mutually converging locating surfaces terminating at a rounded tip at a free end of the probe wherein the first, second, third and fourth surfaces define a pyramid having corners between adjacent surfaces; and a diamond-shaped hole formed in a surface of the part and defined by an inner peripheral surface configured to be immediately adjacent and substantially parallel to each of the locating surfaces of the probe as a single detail to maintain part location integrity only when the end effector is in the proper pick up position and orientation wherein the system takes into account lateral, transverse and angular skews between the single probe and the part.

2. The system as claimed in claim 1 wherein the end effector includes a gripper having a pair of spaced gripping jaws and the part is configured to be picked up by the gripping jaws.

3. The system as claimed in claim 1 wherein each of the corners is blended into a radius and wherein the radii form an outer surface of the rounded tip at the free end of the probe.

4. The system as claimed in claim 1 wherein the diamond-shaped hole has a major length and a minor length approximately one-half the length of the major length.

5. The system as claimed in claim 1 wherein the system further comprises a plate adapted to be fixedly secured to the dunnage about the hole and having an aperture formed completely therethrough, the aperture being substantially identical in size and shape to the hole for reinforcing the part about the hole.

* * * * *